(12) United States Patent
Dow et al.

(10) Patent No.: US 10,157,307 B2
(45) Date of Patent: Dec. 18, 2018

(54) ACCESSIBILITY SYSTEM

(71) Applicant: Facebook, Inc., Menlo Park, CA (US)

(72) Inventors: Paul Alexander Dow, Redwood City, CA (US); Brett Alden Lavalla, San Carlos, CA (US); Jeffrey C. Wieland, Mountain View, CA (US); Shaomei Wu, Mountain View, CA (US); Yuhang Zhao, Menlo Park, CA (US); Lindsay Reynolds, San Carlos, CA (US); Matt King, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 98 days.

(21) Appl. No.: 15/299,353

(22) Filed: Oct. 20, 2016

(65) Prior Publication Data

US 2018/0114054 A1    Apr. 26, 2018

(51) Int. Cl.
*G06K 9/00* (2006.01)
*G06T 11/00* (2006.01)
*G06F 3/16* (2006.01)
*H04L 29/08* (2006.01)
*G06F 17/30* (2006.01)

(52) U.S. Cl.
CPC ........ *G06K 9/00275* (2013.01); *G06F 3/167* (2013.01); *G06F 17/30247* (2013.01); *G06K 9/00288* (2013.01); *G06T 11/00* (2013.01); *H04L 67/20* (2013.01)

(58) Field of Classification Search
CPC ............ G06K 9/00275; G06K 9/00288; G06F 3/167; G06F 17/30247; G06T 11/00; H04L 67/20
See application file for complete search history.

(56) References Cited

U.S. PATENT DOCUMENTS

| | | | |
|---|---|---|---|
| 2010/0106573 A1* | 4/2010 | Gallagher | G06Q 30/02 705/14.4 |
| 2013/0011024 A1* | 1/2013 | Heckman | G06K 9/00248 382/118 |
| 2014/0023248 A1* | 1/2014 | Yoo | G06K 9/00288 382/118 |
| 2015/0189233 A1* | 7/2015 | Carpenter | H04N 7/15 348/14.08 |
| 2016/0027152 A1* | 1/2016 | Hsieh | G06T 5/00 382/254 |
| 2016/0292494 A1* | 10/2016 | Ganong | G06K 9/00288 |
| 2016/0366528 A1* | 12/2016 | Landqvist | G06K 9/00288 |

* cited by examiner

*Primary Examiner* — Ping Hsieh
(74) *Attorney, Agent, or Firm* — Baker Botts L.L.P.

(57) ABSTRACT

In one embodiment, a method includes capturing one or more images of a physical environment surrounding the first user; determining that one or more of the images comprises a face; generating a facial image by cropping a region of the image comprising the face; sending instructions to perform facial recognition on the facial image; receiving a name associated with a second user of the online social network, wherein the face is associated with the second user, wherein the first user is represented by a first node on a social graph maintained by the social-networking system and the second user is represented by a second node on the social graph, and the first node and the second node are connected by at least one edge; and providing an audible indication of the name associated with the second user.

17 Claims, 7 Drawing Sheets

ACCESSIBILITY SYSTEM

TECHNICAL FIELD

This disclosure generally relates to enabling a user to understand more about a particular physical environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

"Accessibility" refers to the design of products, devices, services, or environments for people who experience disabilities. In particular embodiments, an accessibility system may enable a person with visual or hearing disabilities to understand more about his environment. The accessibility system may be a software application installed on a client system (e.g., smartphone) that has a camera, microphone, and speakers. The software application may use object recognition algorithms to identify people and physical objects in real time. One or more cameras on the client system may capture images of its surroundings and the software application may identify faces and objects within those images. If an image contains only a portion of a face, the accessibility system may direct the user through audible or haptic signals to reposition the client system so that the entire face may be captured. In particular embodiments, the accessibility system may also determine the location of people and objects in the client system's environment, and respond to audible commands from a user. As an example and not by way of limitation, a visually-impaired user may be located in a room full of people and other objects, such as a wedding. The wedding may be held in a large banquet hall, and the banquet hall may contain people, tables, chairs, a dance floor, food, restrooms, an open bar, and other wedding items. The user may activate the accessibility system by opening the software application on his client system by a series of pre-determined broad gestures (e.g., swipes), through an audible command (e.g., by saying "open accessibility system" in the microphone of his client system), by simply asking questions or speaking commands within range of the microphone of the client system. As an example and not by way of limitation, the user may say something like the following: "Is Jeremiah here?" "Tell me when you see one of my friends;" "take me to the restroom;" "what kind of food is available?" "find me a place to sit;" and other audible commands. In particular embodiments, the user may wish to find subsets of friends. For example, if the user is at a high school reunion, he may be friends with almost everyone at the reunion. He may ask, "find my closest friends." Or "find my friends that live in another state." The accessibility system may then identify people in the environment and use social networking data associated with the user to identify the people the user is looking for. The user may ask any type of question or speak any command to the client system.

To assist a first user of an online social network who is visually impaired to understand more about the user's environment, the accessibility system may first capture one or more images of a physical environment surrounding the first user, or, alternatively, surrounding the client system on which the accessibility system software is installed. The accessibility system may then analyze the images to determine that one or more of the images comprises a face or an object. The accessibility system may then generate a facial or object image by cropping the region of the image that comprises the face or object. Cropping the image may be one of several optimization techniques the accessibility system employs to perform these operations in real-time. The accessibility system may then send instructions to perform facial recognition on the facial or object image. The accessibility system may then receive a name associated with the face or object. If a face, the name may correspond to a second user of the online social network. The first user and the second user may be represented by nodes on a social graph maintained by the social-networking system, and the nodes representing the users may or may not be connected by one or more edges in the social graph. The accessibility system may also provide one or more audible indications, such as the user's name, the object name, the location of the user, or any other suitable information.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
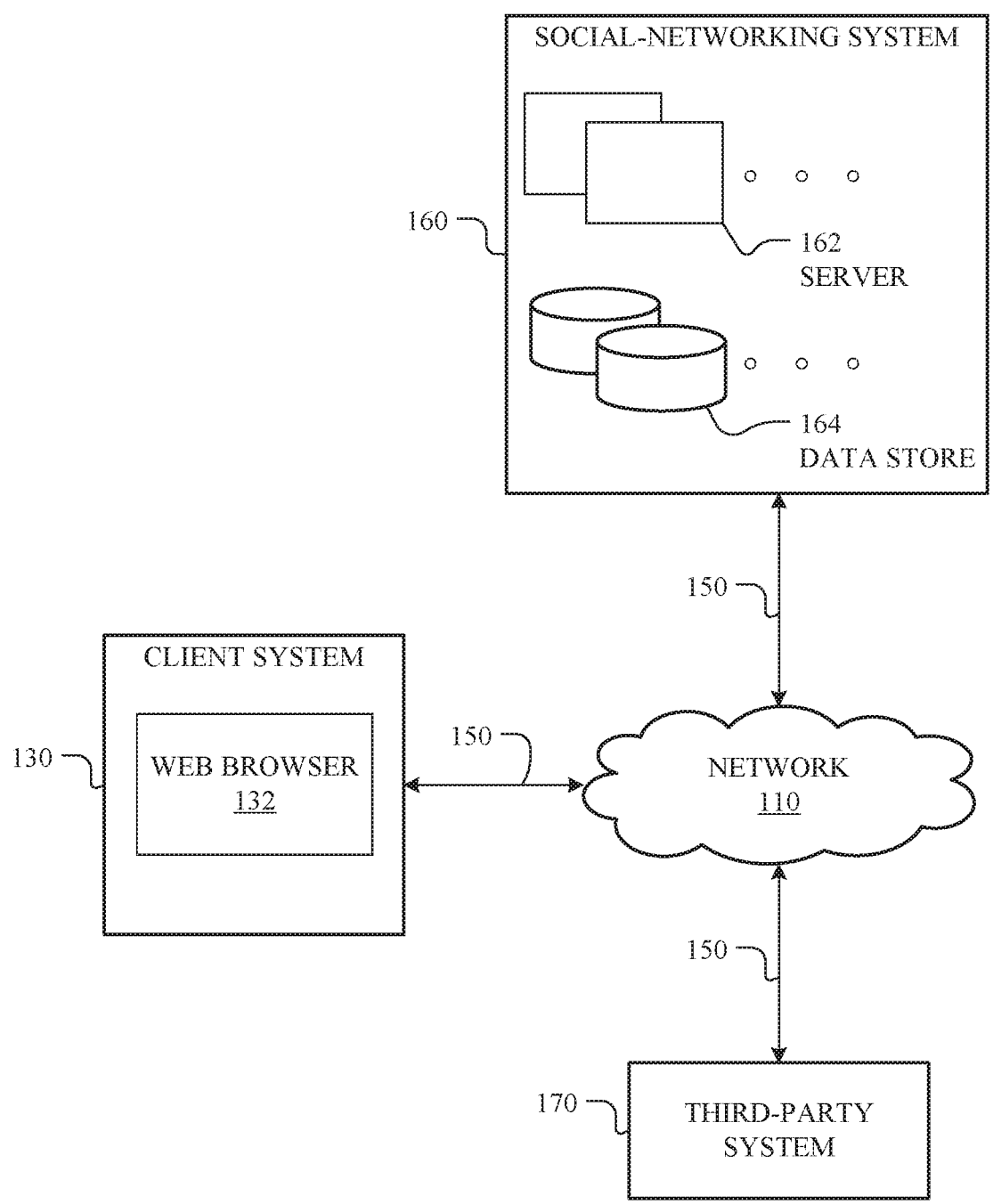
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
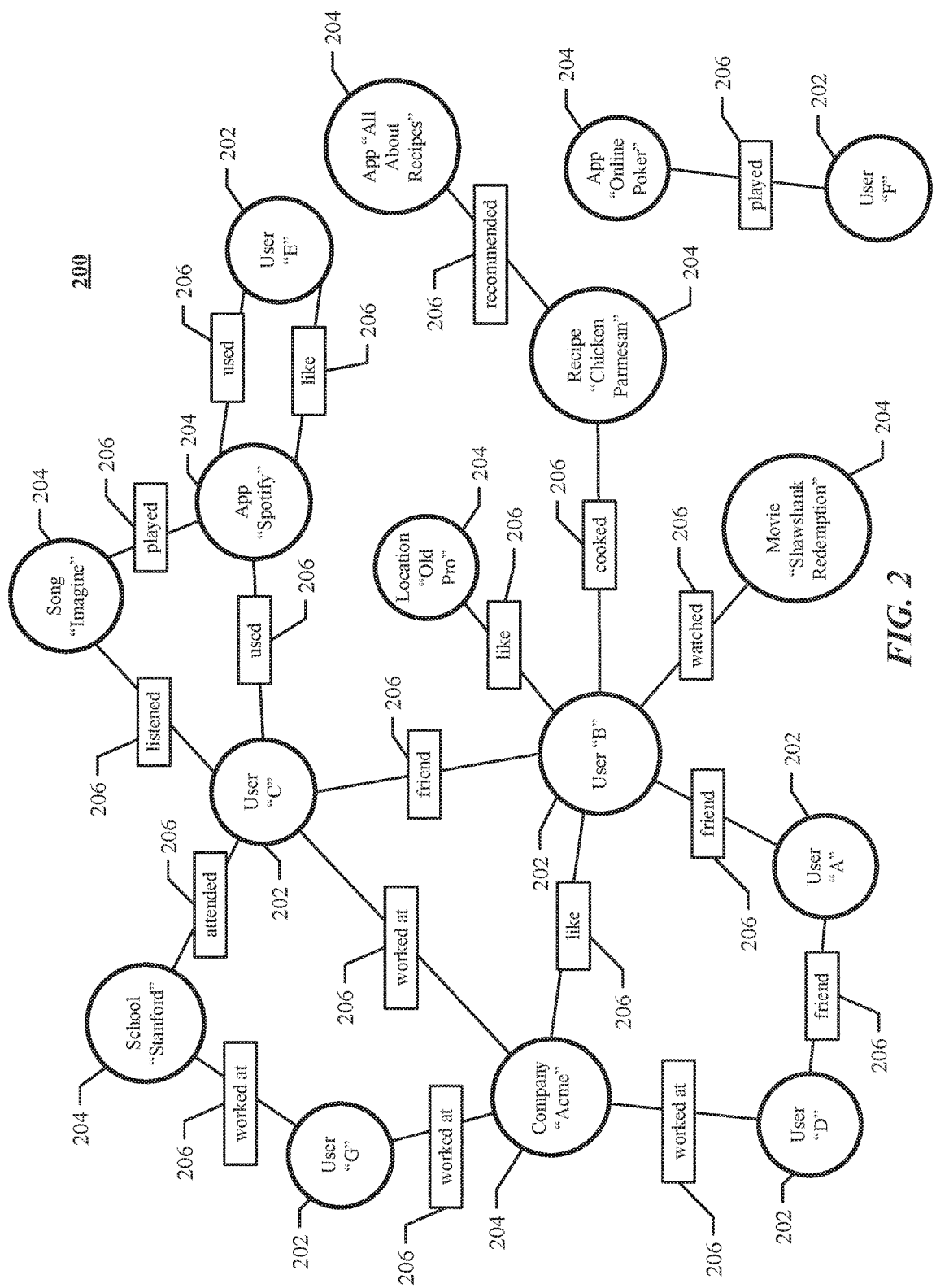
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, an accessibility system may enable a person with visual or hearing disabilities to understand more about his environment. The accessibility system may be a software application installed on a client system (e.g., smartphone) that has a camera, microphone, and speakers. The accessibility system may be maintained by social-networking system 160 or may have access to the social graph 200 maintained by social-networking system 160. The software application may use object recognition algorithms to identify people and physical objects in real time. One or more cameras on the client system may capture images of the device's surroundings and the software application may identify faces and objects within those images. If an image contains only a portion of a face, the accessibility system may direct the user through audible or haptic signals to reposition the client system so that the entire face may be captured. In particular embodiments, the accessibility system may also determine the location of people and objects in the client system's environment, and respond to audible commands from a user. As an example and not by way of limitation, a visually-impaired user may be located in a room full of people and other objects, such as a wedding. The wedding may be held in a large banquet hall, and the banquet hall may contain people, tables, chairs, a dance floor, food, restrooms, an open bar, and other wedding items. The user may activate the accessibility system by opening the software application on his client system by a series of pre-determined broad gestures (e.g., swipes), through an audible command (e.g., by saying "open accessibility system" in the microphone of his client system), by simply asking questions or speaking commands within range of the microphone of the client system. As an example and not by way of limitation, the user may say something like the following: "Is Jeremiah here?" "Tell me when you see one of my friends;" "take me to the restroom;" "what kind of food is available?" "find me a place to sit;" and other audible commands. In particular embodiments, the user may wish to find subsets of friends. For example, if the user is at a high school reunion, he may be friends with almost everyone at the reunion. He may ask, "find my closest friends." Or "find my friends that live in another state." The accessibility system may then identify people in the environment and use social networking data associated with the user to identify the people the user is looking for. The user may ask any type of question or speak any command to the client system.

To assist a first user of an online social network who is visually impaired to understand more about the user's environment, the accessibility system may first capture one or more images of a physical environment surrounding the first user, or, alternatively, surrounding the client system on which the accessibility system software is installed. The accessibility system may then analyze the images to determine that one or more of the images comprises a face or an object. The accessibility system may then generate a facial or object image by cropping the region of the image that comprises the face or object. Cropping the image may be one of several optimization techniques the accessibility system employs to perform these operations in real-time. The accessibility system may then send instructions to perform facial recognition on the facial or object image. The accessibility system may then receive a name associated with the face or object. If a face, the name may correspond to a second user of the online social network. The first user and the second user may be represented by nodes on a social graph maintained by the social-networking system, and the nodes representing the users may or may not be connected by one or more edges in the social graph. The accessibility system may also provide one or more audible indications, such as the user's name, the object name, the location of the user, or any other suitable information.

In particular embodiments, client system 130 (e.g., a computing device such as a smartphone) associated with a first user of an online social network may capture one or more images of a physical environment surrounding the client system. The images may be captured by one or more front- or rear-facing cameras on client system 130. The images may be still images or video that is continuously captured by client system 130. The images may be stored on client system 130, may be sent to a remote server, or may not be stored anywhere after the accessibility system has performed analysis on the images. Client system 130 may continuously capture the images (e.g., by video capture) or may capture images at regular intervals (e.g., one image every two seconds). In particular embodiments, the accessibility system may vary the rate at which it captures images based on data from various sensors within client system 130. For example, if there are few activities around the user so that there are few changes over time, the images may be recorded at a lower rate (e.g., one image per ten minutes). As an example and not by way of limitation, a microphone on the client system may not capture any sound. This may be indicative of little activity around the user; thus no image needs to be captured. However, if there are more activities around the user (e.g., some sudden movements as indicated by the accelerometer or camera), images may be recorded at a higher rate (e.g., one image per two seconds). Thus, the rate of recording may be automatically adjusted based on the amount of activities or motions or movements around the user or by the user. More movements or sound may result in a higher rate of recording, while fewer movements or sound may result in a lower rate of recording. Although this disclosure describes capturing images in a particular manner, this disclosure contemplates capturing images in any suitable manner.

In particular embodiments, the accessibility system may capture images in response to detecting a signal from the user. The signal may be an audible command or question or may be user input through a touchscreen on client system 130. The accessibility system may not capture images until it is instructed to do so by the user. As an example and not by way of limitation, the user may enter a room with several people in it and may speak a command near a microphone of client system 130, such as "Who is here?" In response to this question, the accessibility system may begin capturing images of the people in the room. In particular embodiments, the accessibility system may direct the user by audible or haptic signals to move around the room so that better images may be captured. As an example and not by way of limitation, there may be many people at the far end of the room, but they may be too far away for the camera on client system 130 to capture a sufficiently detailed image of their faces. The accessibility system may direct the user to move in a particular direction or along a particular path so that better images may be captured. Although this disclosure describes capturing images in response to detecting a signal from the user in a particular manner, this disclosure contemplates capturing images in response to detecting a signal from the user in any suitable manner.

Figure 3:
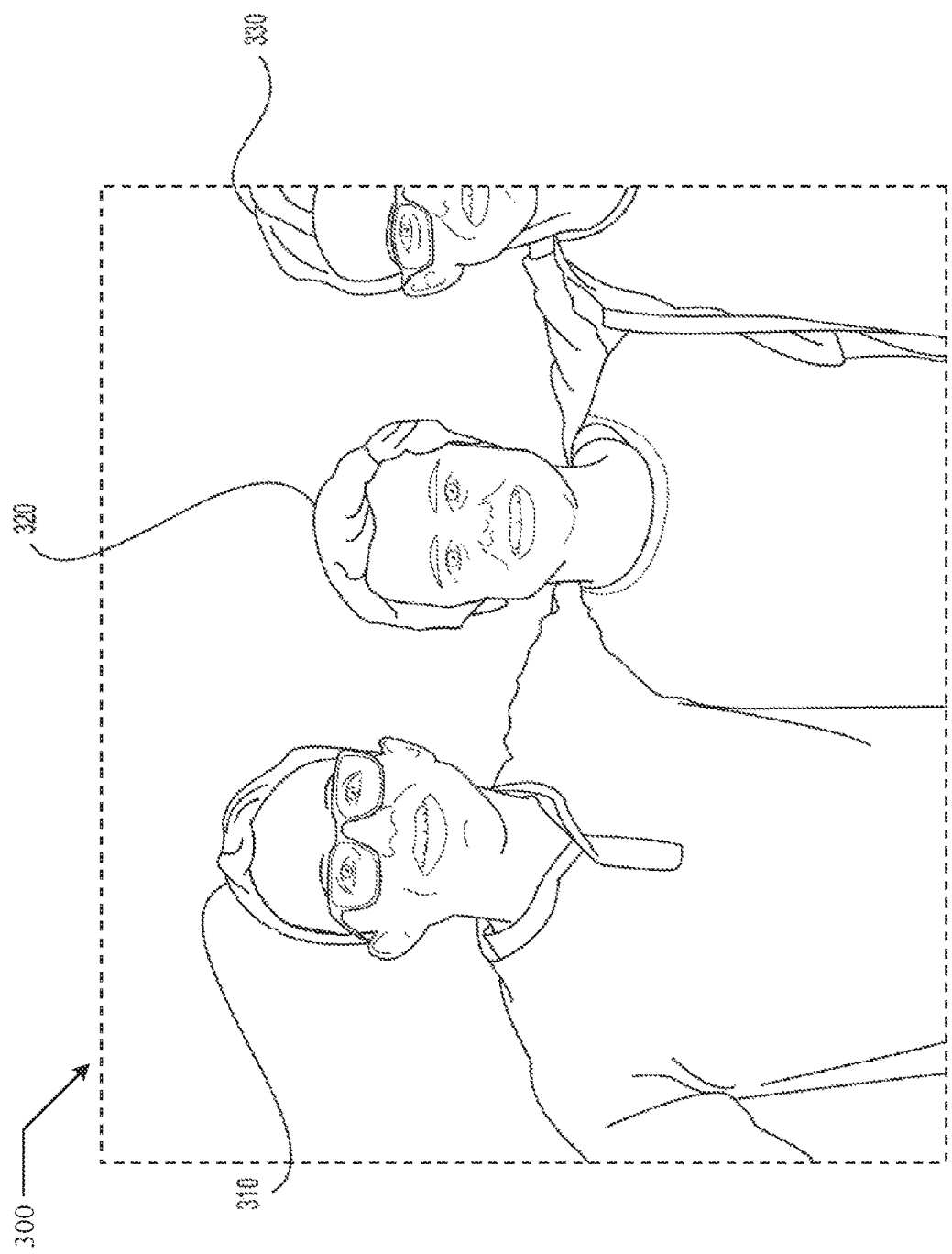
FIG. 3 illustrates an example image captured by the accessibility system.

FIG. 3 illustrates an example image 300 captured by a camera on client system 130 associated with a first user. Image 300 may comprise users 310, 320, and 330. In particular embodiments, the camera on client system 130 may capture only a portion of a person's face, such as that of user 330. Such a portion may be insufficient to make an accurate identification of user 330. In response to detecting that there are one or more people whose faces are insufficiently captured, the accessibility system may direct the user to reposition the camera to better capture those people's faces. As an example and not by way of limitation, the accessibility system may instruct client system 130 to vibrate once if the user should shift the camera angle to the right, and twice if the user should shift the camera angle to the left. Alternatively, or in addition, the accessibility system may emit audible directions for the user to shift the camera angle in a particular direction. In the example image 300, the accessibility system may direct the user to shift the camera to the right, so that user 330 may be fully visible by the camera. The same process may be applicable to objects within a room. The accessibility system may direct the user to move or shift the camera angle so as to more fully capture an object. Although this disclosure describes capturing images in a particular manner, this disclosure contemplates capturing images in any appropriate manner.

In particular embodiments, the accessibility system may determine that one or more of the images comprise a face. This may be accomplished using conventional face-detection methods. At this point, the accessibility system may not recognize any faces (e.g., associate a name with a face). Instead the accessibility system may simply determine that one or more faces are present in the image. As an example and not by way of limitation, the accessibility system may analyze image 300 and recognize that at least two full faces are present (those of users 310 and 320) and one partial face is present (that of user 330). Although this disclosure analyzing images in a particular manner, this disclosure contemplates analyzing images in any appropriate manner.

Figure 4:
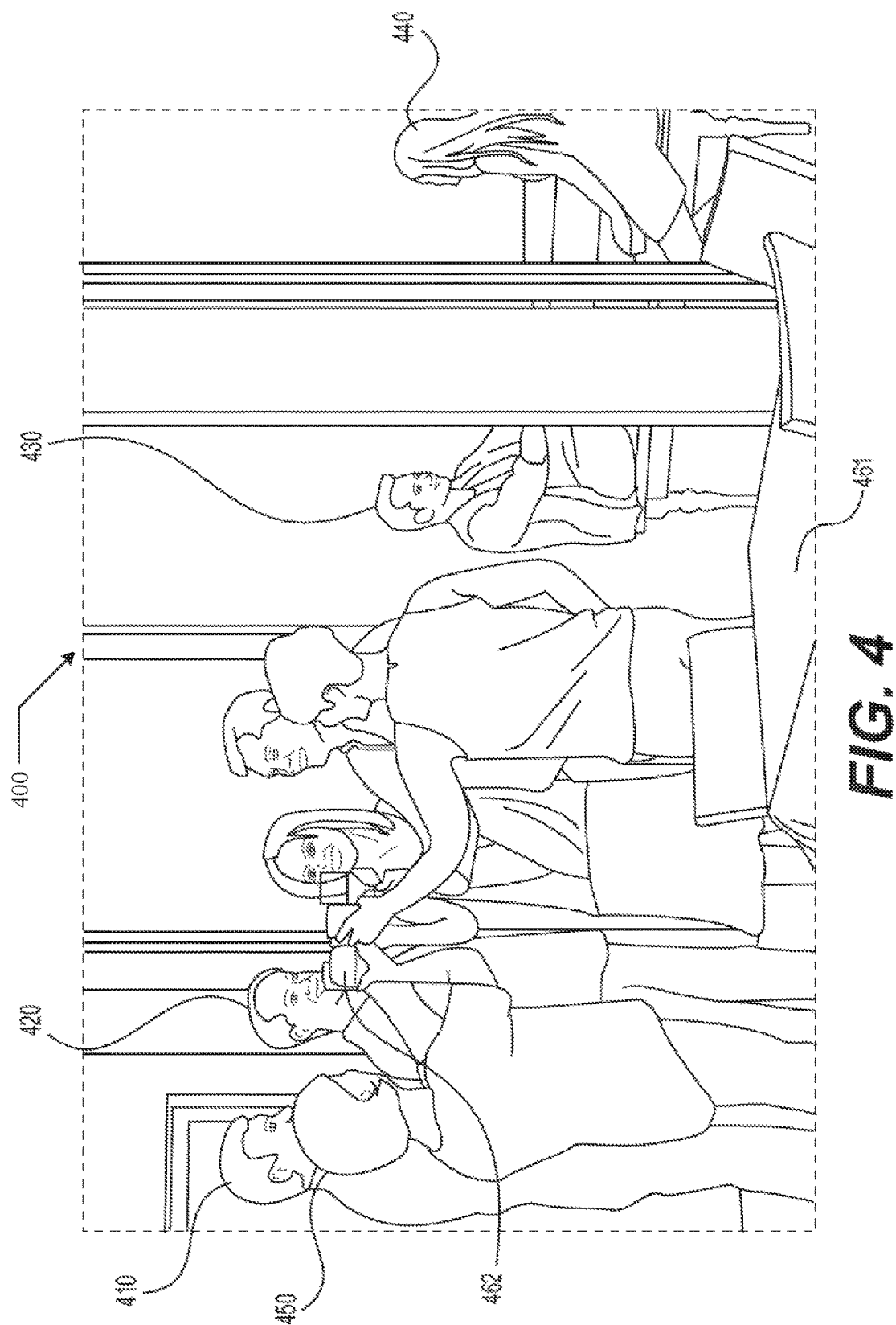
FIG. 4 illustrates another example image captured by the accessibility system.

FIG. 4 illustrates another example image 400 captured by the accessibility system. Image 400 may represent an image captured by client system 130 of housewarming party that the first user is attending. Image 400 may have been captured by one or more cameras of client system 130 in response to the user saying, "are any of my friends here?" Alternatively, image 400 may have been captured automatically when the first user entered the environment illustrated by image 400. The accessibility system may detect when a user enters a new environment by monitoring changes in the ambient noise near the device. If the level of the ambient noise changes by a threshold amount, the accessibility system may determine that client system 130 has entered a new environment, and may begin to capture images of the new environment. Other factors that may cause the accessibility system to detect that client system 130 has entered a new environment may be changes in temperature, air pressure, light, or any other suitable factor as detected by the sensors on client system 130. Image 400 may comprise users 410-450 and objects 461 and 462. Users 410-450 may be facing various directions; some may be facing the camera (e.g., users 420 and 430). Some users may be partially facing the camera (e.g., users 410 and 450), and some users may be facing away from the camera (e.g., user 440) or out of the image entirely. Image 400 may have been captured by client system 130 in response to a command from the user or automatically using the methods described above when the user entered the environment depicted by image 400. Although this disclosure describes capturing images in a particular manner, this disclosure contemplates capturing images in any appropriate manner.

In particular embodiments, the accessibility system may perform one or more optimizations on the images. One example optimization may be to generate a facial image by cropping a region of the image that comprises the face. The accessibility system may function similarly for objects: it may generate an object image by cropping a region of the image that comprises an object. The accessibility system may crop several faces from the same image and thus create several facial images (e.g., one facial image for each face). As an example and not by way of limitation, the accessibility system may generate a new facial image for each person in image 400. In particular embodiments, this may include people whose faces are not visible by the camera (e.g., user 440) as well as people who are not users of the online social network. Cropping a region of the image that comprises a face or object may be only one of several optimizations the accessibility system may perform. Examples of other optimizations include scaling down an image by changing its format, converting an image to black and white, cropping out unneeded parts of an image, and identifying and caching "familiar faces" locally on the user's mobile device.

As an example of caching "familiar faces" and not by way of limitation, the accessibility system may perform the following actions: after the accessibility system has recognized a particular face a threshold number of times (e.g., three times), it may store that face locally on the user's mobile device. Then, when the accessibility system recognizes faces in the future, it may compare new facial images to the cached face for quick recognition. In particular embodiments, the accessibility system may first compare the facial image to images stored in a cache and then if no matches are found, the accessibility system may send the facial image to a remote server for facial recognition. In particular embodiments, instead of using a threshold number of recognitions, the accessibility system may instruct client system 130 to store a particular number of faces locally at all times. As an example and not by way of limitation, the accessibility system may instruct client system 130 to store the facial profiles of the 15 most-recognized faces by the accessibility system over the past week, month, or year. In particular embodiments, the accessibility system may instruct client system 130 to store the facial profiles of the user's closest friends.

In particular embodiments, the identification of faces and familiar faces may be accomplished by using social graph information stored on social graph 200. As an example and not by way of limitation, users 410-450 may be users of the online social network, and may be represented by nodes in social graph 200 maintained by social-networking system 160. The nodes representing users 410-450 may be connected by one or more edges to the node representing the user whose client system 130 captured image 400. The edges connecting these nodes may mean that users 410-450 are friends with the first user, friends-of-friend of the first user, or are otherwise connected to the first user. In particular embodiments, an edge may have a particular edge-type, representing the type of relationship the edge represents. Example edge types between user nodes on social graph 200 may include friend edges, acquaintance edges, family edges, colleague edges, classmate edges, and so on. User nodes may be connected by edges indirectly through other user nodes or entity nodes (e.g., two user nodes may be connected by two "attended" edges and a node corresponding to Stanford University).

The user's closest friends may be users with the highest affinity coefficients between themselves and the user. These optimizations may facilitate and/or speed up facial recognition so that the accessibility system may recognize users quickly and communicate this information to the user as fast as is feasible. Although this disclosure describes performing particular optimizations in a particular manner, this disclosure contemplates performing any suitable optimization in any suitable manner.

Figure 5:
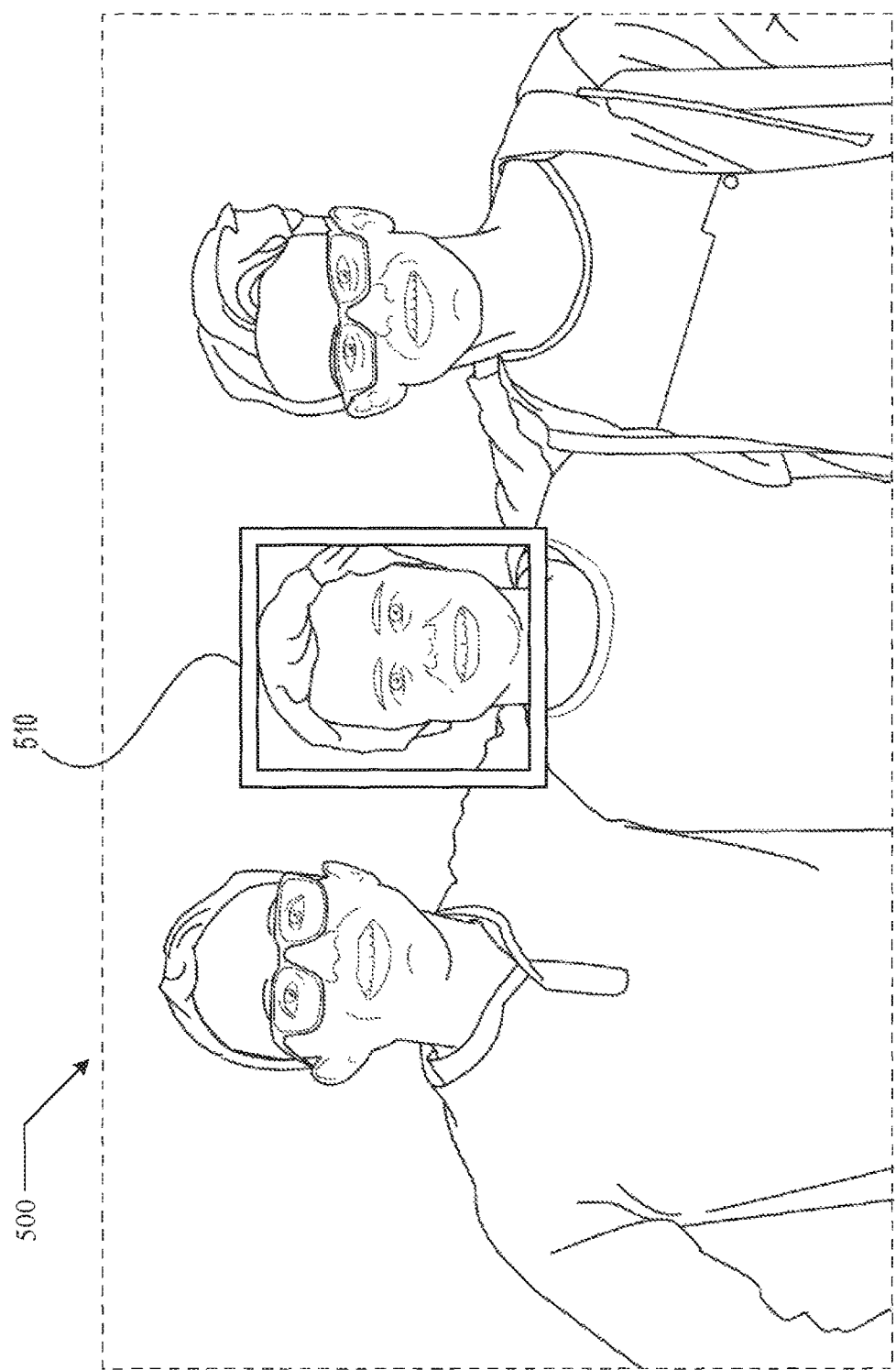
FIG. 5 illustrates another example image captured by the accessibility system.

FIG. 5 illustrates another example image 500 captured by the accessibility system. Image 500 may comprise one or more faces of users of the social networking system. The accessibility system may crop a region 510 of image 500, wherein the region comprises a face. In this example, the accessibility system may crop a region 510 with the face of user 320. The cropped region 510 of image 540 may be used to create a facial image. Although this disclosure describes cropping a region of an image in a particular manner, this disclosure contemplates cropping a region of an image in any suitable manner.

In particular embodiments, the accessibility system may send instructions to perform facial recognition on the facial image. The goal of performing facial recognition may be to associate a name with each facial image. This way the accessibility system may be able to identify one or more of the people who are in the same environment as client system 130. It is contemplated that each user of the online social network has one or more pictures associated with the user. As an example and not by way of limitation, social-networking system 160 may store a profile picture for a user, Jerry. Jerry may also be tagged in one or more additional photos that are stored with social-networking system 160. The accessibility system may use Jerry's profile picture along with all the other photos he is tagged in to create a facial profile about Jerry. This facial profile may be used during the facial recognition process. As an example and not by way of limitation, during facial recognition, the accessibility system or another software application may compare the facial image to Jerry's facial profile. If it is determined that the facial image matches Jerry's facial profile, the accessibility system may determine that the face in the facial image belongs to Jerry. Social-networking system 160 may create facial profiles for each user of the online social network which may be used during facial recognition. Although this disclosure describes sending instructions to perform facial recognition in a particular manner, this disclosure contemplates sending instructions to perform facial recognition in any suitable manner.

In particular embodiments, the accessibility system may perform one or more optimizations to speed up facial recognition. Examples of optimizations that may speed up facial recognition are to use location data of users, and to use social networking data from social graph 200 to make intelligent decisions about the images. In particular embodiments, the accessibility system may use a location sharing feature on the client systems of users of the online social network. Users of the online social network may choose to share their location with other users of the online social network (e.g., their friends). The accessibility system of a first user may use the location data of other users to shrink the pool of potential face matches. As an example and not by way of limitation, if a first user attends a bar mitzvah in Colorado, he may ask the accessibility system, "who is in attendance?" The accessibility system may then begin to capture and analyze images. It may use the data in the images along with the location information of users of the online social network. The user's friend Rebecca may have enabled location sharing on her client system, and the location of her client system may be in North Carolina. Thus, Rebecca is probably not at the bar mitzvah in Colorado. Therefore, the accessibility system may exclude Rebecca from the pool of people with which to compare facial images. This may be applied to any user who has enabled location sharing. In particular embodiments, the accessibility system may sort users based on their location data. Continuing with the bar mitzvah example, if users Danny and Lindsay have location sharing enabled on their client systems and their location indicates that they are located in the same town in which the bar mitzvah is being held, the accessibility system may compare facial images to the facial profiles of Danny and Lindsay before other users of the online social network. Although this disclosure describes using location sharing in a particular manner, this disclosure contemplates using location sharing in any suitable manner.

In particular embodiments, the accessibility system may use social networking data from social graph 200 to make intelligent decisions about the images. Social graph 200 may store various information about each user, such as the user's interests, occupation, check-ins, viewing habits, political preferences, and so forth. The accessibility system may use this information to make predictions about whether or not a user may be in the same environment as the first user. As an example and not by way of limitation, a first user may attend the Republican National Convention. When the accessibility system or other software application performs facial recognition, it may exclude users whose social graph data suggests are strong democrats, because it is unlikely that a democrat would attend the Republican National Convention. The accessibility system may be able to determine a user's political preference based on content objects on the online social network that the user has liked or commented on, or on content the user has posted to the online social network. This determination may be based on affinity coefficients that a user may have toward various entities or concept nodes, as described in detail above. In particular embodiments, the accessibility system may use social networking data to more accurately identify facial images. As an example and not by way of limitation, with reference to the example illustrated in FIG. 4, the accessibility system may initially be unable to accurately identify a name associated with user 450 because her face may be only partially present. The accessibility system may create a partial facial image of user 450 that comprises information of only part of her face. However, other users may be identified based on facial images alone (e.g., user 420 may be identified as Tim, and user 430 may be identified as Joe). The accessibility system may have access to Tim's and Joe's social networking information by way of social graph 200. It is likely that user 450 may be friends with other users who are also attending the housewarming party, like Tim and Joe. The accessibility system may compare the partial facial image of user 450 to the facial profiles of Tim's and Joe's first and second degree connections on the online social network. This may greatly reduce the pool of candidates that may match the partial facial image of user 450, and may make it possible to make an accurate identification using only a partial facial image. Although this disclosure describes using social networking data in a particular manner, this disclosure contemplates using social networking data in any suitable manner.

In particular embodiments, in response to sending the instructions to perform facial recognition on the facial image, the accessibility system may receive a name associated with a second user of the online social network, wherein the face in the facial image is associated with a second user. As explained previously, the first user and the second user may each be represented by a node on social graph 200. In particular embodiments, the node corresponding to the first user may be connected by at least one edge to the node corresponding to the second user. In particular embodiments, the accessibility system may receive information in addition to or in place of the second user's name. Such information may include the second user's interests, one or more status updates or content objects that the user has recently posted to the online social network, a school that the second user attends or attended, any place of employment of the second user, or any other suitable information that the second user may wish to share with other users of the online social network. Privacy may be a concern among users of the online social network, so in particular embodiments, each user may be able to specify whether or not the accessibility system may access information about the user. Thus, the second user may adjust her privacy settings to allow the accessibility system to access any level of information the second user deems appropriate. This may be limited to no information, or may be limited to only particular items, such as the university she graduated from but not her city of residence. As an example and not by way of limitation, a second user, Michelle, may have adjusted her privacy settings to allow the accessibility bot to access her first name but not her last name, her place of employment, and the subject of her college studies, but not where she attended college. Thus, when the accessibility system identifies Michelle's face as being associated with Michelle, it may receive Michelle's first name, that she works at SALESFORCE, and that she studied American History in college. In particular embodiments, the second user may choose to share different things with different users depending on the number of degrees of separation between the second user and other users. As an example and not by way of limitation, Michelle may choose to share her entire profile with her first degree connections (e.g., her friends), her full name, city of residence, place of employment, and alma mater with her second degree connections (e.g., her friends-of-friends), and only her first name and occupation with all the other users of the online social network. Thus, if the first user and Michelle have no friends in common (e.g., they have a third degree connection or higher), the accessibility system may only receive Michelle's first name and that her occupation is a sales manager. Although this disclosure describes receiving information about a user in a particular manner, this disclosure contemplates receiving information about a user in any suitable manner.

In particular embodiments, the accessibility system may provide an audible indication of the name associated with the second user. In particular embodiments, the accessibility system may provide an audible indication of other information associated with the second user, such as her occupation, city of residence, and other social networking information, as described above. As an example and not by way of limitation, the first user may speak, "Which of my friends are here?" to the accessibility system, the accessibility system may respond a short time later with this response: "So far it looks like Jessica, Brendan, Sonni, and Jason are here." In particular embodiments, the accessibility system may direct the user to move around the environment so that more images may be captured. As an example and not by way of limitation, the first user may speak, "Which of my friends are here?" to the accessibility system, the accessibility system may respond a short time later with this response: "So far it looks like Jessica, Brendan, Sonni, and Jason are here. Move around a bit so I can see if more of your friends are here." In particular embodiments, the user may ask many types of questions or speak many types of commands to the accessibility system. In response to each question or command, the accessibility system may respond with an appropriate answer, as discussed herein. Although this disclosure describes receiving information about a user in a particular manner, this disclosure contemplates receiving information about a user in any suitable manner.

In particular embodiments, the above discussion regarding users may apply to objects. That is, the accessibility system may determine that one or more of the images comprises an object, then the accessibility system may generate an object image by cropping a region of the image comprising the object. The accessibility system may send instructions to perform object recognition on the object image. These instructions may be sent internally to another component of the accessibility system on client system 130, or they may be sent to a remote server. The accessibility system may then receive a description associated with the object, and in response, the accessibility system may provide an audible indication of the description associated with the object. As an example and not by way of limitation, the accessibility system may capture an image that includes a laptop computer. The accessibility system may determine that a region of the image comprises an object, but it may not immediately recognize what the object is. In particular embodiments, the accessibility system may not decipher between objects and faces; it may simply determine that some item is located in a particular location in the image. The accessibility system may crop the region that includes the laptop to create an object image and may send instructions to perform object recognition on the object image. The accessibility system may receive a description of the object. The description may include an approximate size, color, make model, or any other suitable description. To continue the laptop example, the accessibility system may receive a description that the object is a gray laptop, made by APPLE. In particular embodiments, the description may be even more precise, such as a description that the object is a thirteen inch MACBOOK AIR. The accessibility system may then provide an audible indication of the description associated with the object, such as "That object is a laptop," or "That object is a thirteen inch MACBOOK AIR, made by APPLE." As another example and not by way of limitation, with reference to example image 400 of FIG. 4, the accessibility system may identify that user 450 is holding object 462. The accessibility system may perform the steps described herein and determine that object 462 is a wine glass filled with red wine. The accessibility system may then communicate this information to the first user via client system 130. Although this disclosure describes identifying objects in a particular manner, this disclosure contemplates identifying objects in any suitable manner.

In particular embodiments, the accessibility system may provide a user with directions on how to improve a photo. When a visually impaired user wishes to take a photo, the accessibility system may identify one or more enhancements that may be applied to the image, either before or after the image is captured. As an example and not by way of limitation, the accessibility system may determine that the photo is off-center, out of focus, too dark, too bright, has too much backlighting (which may cause the subject of the photo to appear as a silhouette), the subject of the photo is too small or too large, and other problems. The accessibility system may identify enhancements to improve upon the above mentioned issues, as well as any other issue that may need improvement and then provide information regarding the enhancements. As an example and not by way of limitation, the accessibility system may provide information about how to re-position client system 130, in the form of an audible or haptic indication that the user should move or tilt the camera in a particular direction. As an example and not by way of limitation, the accessibility system may state, "move the camera to the left until you feel the vibration." This may prompt the user to slowly pan the camera to the left until she feels a vibration. Client system 130 may gather positioning data using one or more sensors and provide the positioning data to the accessibility system. The vibration may indicate that the camera is positioned correctly and the user may take a properly centered photo. Instead of a vibration, the accessibility system may instruct client system 130 to emit another audible signal, such as a beep. As another example and not by way of limitation, the accessibility system may detect if a photo a user is about to take will be out of focus, and the accessibility system may warn the user with an indication (e.g., audible indication or haptic) that the photo is out of focus. In particular embodiments, the information provided by the accessibility system may comprise a menu of options that may be dictated to the user. As an example and not by way of limitation, the accessibility system may dictate a flash option to the user by stating: "It looks like it's a little too dark to take a good photo. Do you want to turn on the flash?" Other examples of information regarding the enhancements may include instructions for the user to tap on the screen, or to move client system 130 closer to or farther away from the subject of the photo. The accessibility system may make similar determinations and provide similar warnings and instructions for other problems a photo may have, such as bad lighting, off-centeredness, crookedness, and the like. In particular embodiments, the accessibility system may receive user input in response to the provided information. This user input may be the user re-positioning the camera, selecting a menu option, or performing any suitable adjustment to the photograph. Although this disclosure describes providing directions to improve a photo in a particular manner, this disclosure describes providing directions to improve a photo in any suitable manner.

In particular embodiments, the accessibility system may determine an approximate location of a second user or object, and may include that location when it provides the audible indication of the person's name, object's description, or other suitable information as described herein. The client system 130 may be equipped with a dual camera lens that may enable more accurate depth perception, or the accessibility system may use image processing techniques to determine an approximate location of a second user or object in relation to client system 130 when the image was captured. Referring to the example in FIG. 4, the accessibility system may analyze image 400 and determine that users 410, 420, and 450 are approximately twelve feet in front of the location where image 400 was captured. The accessibility system may also determine that users 430 and 440 are approximately twenty feet in front of the location where image 400 was captured and slightly to the right (e.g., the user's "1 o'clock"). The accessibility system may also determine that a table 461 is approximately eight feet in front of the user. The accessibility system may also determine that on table 421 are some appetizers. Thus the user may be able to enter the housewarming party environment and ask the accessibility system "where is the food?" The accessibility system may be able to determine where the food is located. The accessibility system may make this determination in response to a prompting from the user, or may make this determination automatically, without user input. The accessibility system may then provide the user with navigation directions to direct the user to reach the food, as will be discussed in more detail below. Although this disclosure describes determining an approximate location of a second user or object in a particular manner, this disclosure contemplates determining an approximate location of a second user or object in any suitable manner.

In particular embodiments, the accessibility system may compute a path that comprises an end point associated with a person corresponding to the face in the captured images, wherein a starting point for the path is determined with respect to the computing device. The accessibility system may also provide navigation information to direct the first user in relation to the path. The navigation information may include instructions that enable a visually impaired user to walk or otherwise navigate to another user in the environment. As an example and not by way of limitation, a user may enter an environment that is similar to the example environment illustrated in FIG. 4. The user may ask the accessibility system, "are any of my friends here?" The accessibility system may then perform the steps discussed herein and determine that the user's friend Jim is present in the environment. Jim may be user 410. The accessibility system may state "Yes, your friend Jim is here." The user may then state "Take me to him," or any other suitable instructions. In particular embodiments, the accessibility system may automatically provide instructions on how the user may reach Jim without the user needing to provide any audible instructions. The accessibility system may then provide instructions on how to reach Jim. As an example and not by way of limitation, the accessibility system may state: "walk forward for 5 steps and you will reach Jim," or any other suitable instructions. In particular embodiments, computing the path comprises identifying one or more obstacles between the starting point and the end point, wherein the navigation information comprises instructions to direct the first user to the end point while avoiding the obstacles. As an example and not by way of limitation, the user may ask if his friend Jusok is in the environment, and if so, to direct him to Jusok. Jusok may be user 430. As the accessibility system computes a path between the user and Jusok, it may identify table 461 as blocking the path between the user and Jusok. The accessibility system may then provide instructions to direct the user to Jusok while avoiding table 461. The instructions may include something similar to the following: "walk ahead for 3 strides. There is a table between you and Jusok, so turn right after three strides to avoid the table, then turn left to continue toward Jusok for 4 more strides." To gauge depth perception, the accessibility system may use any image processing means that are available to it, including the use of dual cameras that may be part of client system 130. Although this disclosure describes computing a path to a user in a particular manner, this disclosure contemplates computing a path to a user in any suitable manner.

Figure 6:
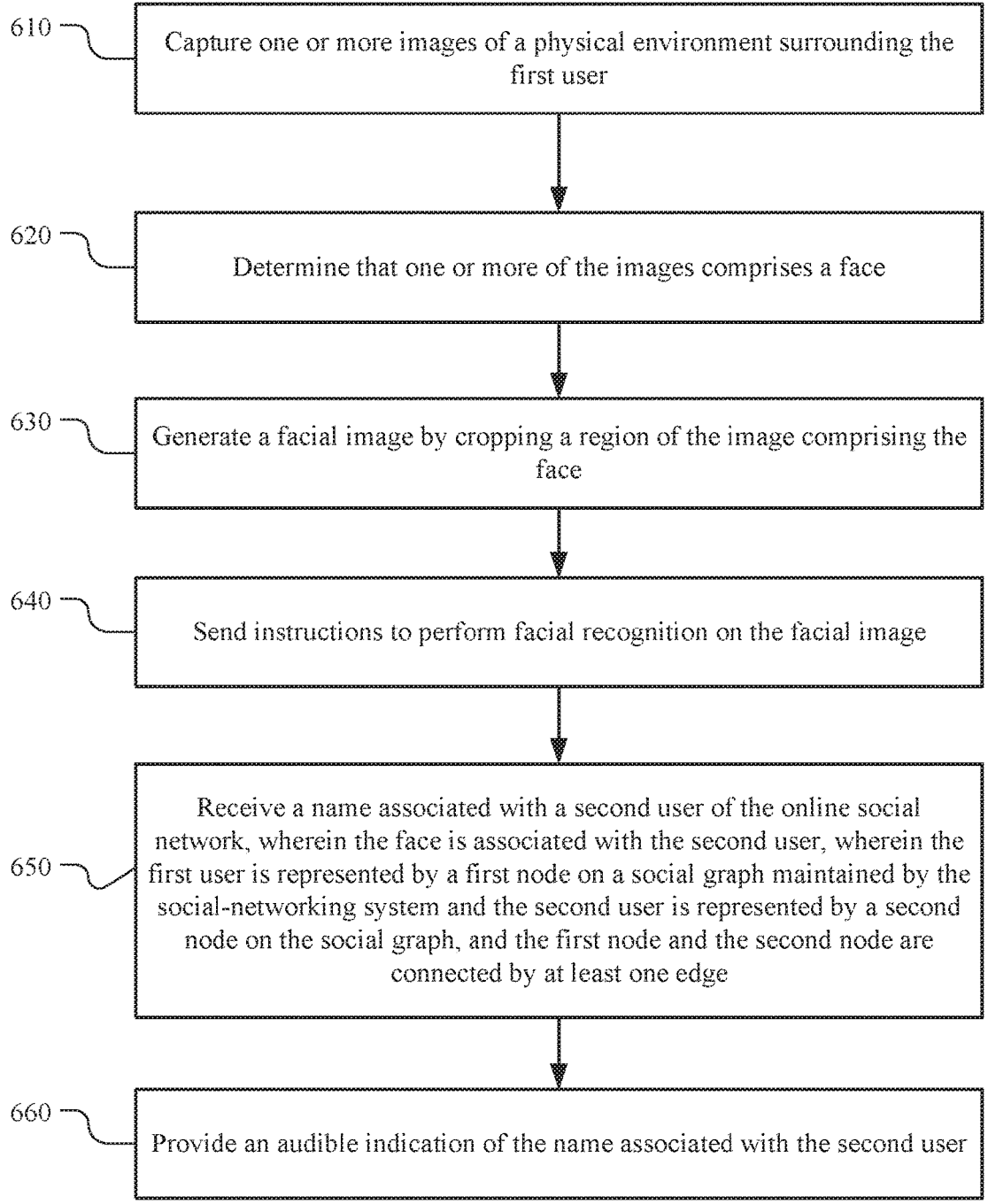
FIG. 6 illustrates an example method for assisting a visually impaired user to understand more about the user's environment.

FIG. 6 illustrates an example method 600 for enabling a user to understand more about a physical environment. The method may begin at step 610, where the accessibility system may capture one or more images of a physical environment surrounding the first user. At step 620, the accessibility system may determine that one or more of the images comprises a face. At step 630, the accessibility system may generate a facial image by cropping a region of the image comprising the face. At step 640, the accessibility system may send instructions to perform facial recognition on the facial image. At step 650, the accessibility system may receive a name associated with a second user of the online social network, wherein the face is associated with the second user, wherein the first user is represented by a first node on a social graph maintained by the social-networking system and the second user is represented by a second node on the social graph, and the first node and the second node are connected by at least one edge. At step 660, the accessibility system may provide an audible indication of the name associated with the second user. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for enabling a user to understand more about a physical environment including the particular steps of the method of FIG. 6, this disclosure contemplates any suitable method for enabling a user to understand more about a physical environment including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
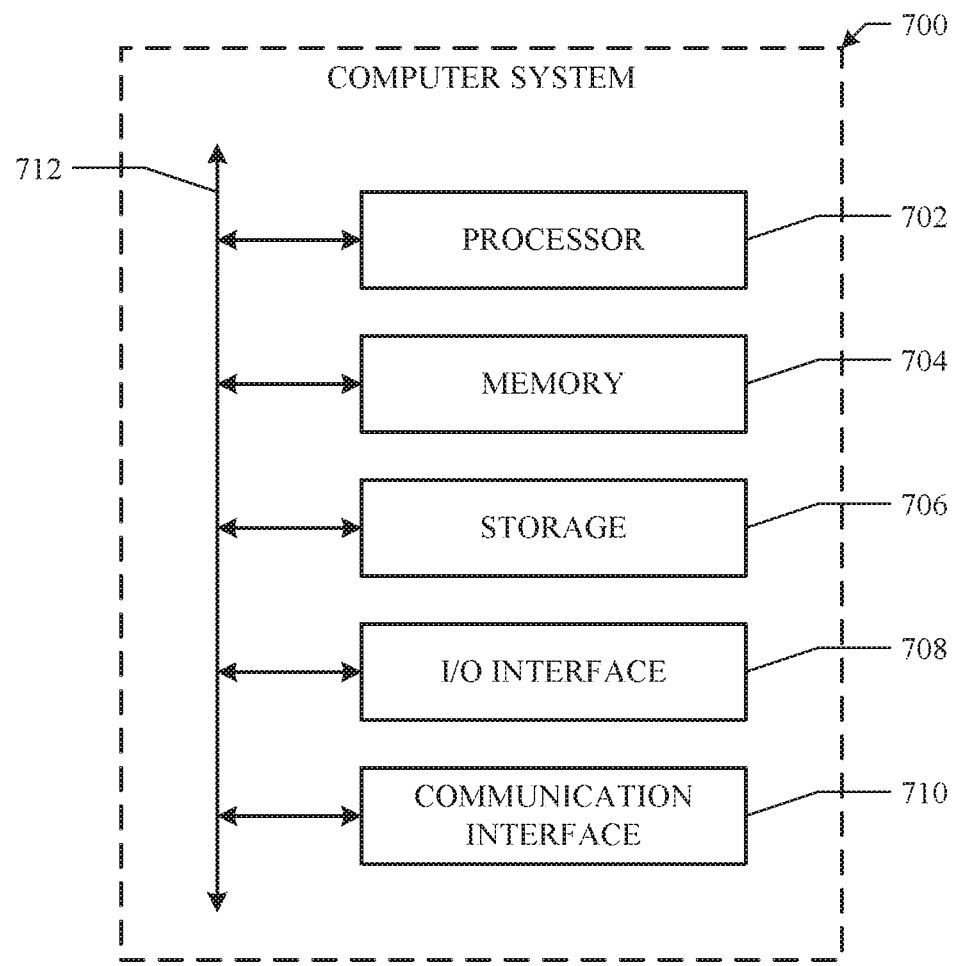
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device associated with a first user of an online social network hosted by a social-networking system, capturing one or more images of a physical environment surrounding the first user;
   by the computing device, determining that one or more of the images comprises a face;
   by the computing device, generating a facial image by cropping a region of the image comprising the face;
   by the computing device, sending instructions to perform facial recognition on the facial image;
   by the computing device, receiving a name associated with a second user of the online social network, wherein the face is associated with the second user, wherein the first user is represented by a first node on a social graph maintained by the social-networking system and the second user is represented by a second node on the social graph, and the first node and the second node are connected by at least one edge;

by the computing device, providing an audible indication of the name associated with the second user;
comparing the facial image to one or more cached images on the computing device;
determining that the facial image does not match any of the one or more cached images; and
sending, to a server, a request comprising the facial image to perform facial recognition.

2. The method of claim 1, wherein one or more cameras of the computing device continuously capture the images in response to detecting an audible command.

3. The method of claim 1, further comprising:
determining that one or more of the images comprises an object;
generating an object image by cropping a region of the image comprising the object;
sending instructions to perform object recognition on the object image;
receiving a description associated with the object; and
providing an audible indication of the description associated with the object.

4. The method of claim 1, wherein the audible indication comprises an approximate location of the second user.

5. The method of claim 1, further comprising:
computing a path comprising an end point associated with a person corresponding to the face in the one or more images, wherein a starting point for the path is determined with respect to the computing device; and
providing navigation information to the first user in relation to the path.

6. The method of claim 5, wherein the computing the path comprises identifying one or more obstacles between the starting point and the end point, and wherein the navigation information comprises instructions to direct the first user to the end point while avoiding the obstacles.

7. The method of claim 1, wherein capturing one or more images comprises:
identifying one or more enhancements that may be applied to one or more of the images;
providing information regarding the one or more enhancements; and
receiving user input in response to the provided information.

8. The method of claim 1, further comprising:
determining that an affinity between the first user and the second user exceeds a threshold affinity; and
storing one or more pictures of the second user in a local cache on the computing device.

9. The method of claim 1, further comprising:
by the computing device, determining that the one or more images comprise a portion of an entire face; and
by the computing device, providing instructions to reposition the computing device to capture the entire face.

10. One or more computer-readable non-transitory storage media embodying software that is operable when executed to:
capture one or more images of a physical environment surrounding a first user of an online social network hosted by a social-networking system;
determine that one or more of the images comprises a face;
generate a facial image by cropping a region of the image comprising the face;
send instructions to perform facial recognition on the facial image;
receive a name associated with a second user of the online social network, wherein the face is associated with the second user, wherein the first user is represented by a first node on a social graph maintained by the social-networking system and the second user is represented by a second node on the social graph, and the first node and the second node are connected by at least one edge;
provide an audible indication of the name associated with the second user;
compute a path comprising an end point associated with a person corresponding to the face in the one or more images, wherein a starting point for the path is determined with respect to the computing device; and
provide navigation information to the first user in relation to the path.

11. The media of claim 10, wherein one or more cameras of the computing device continuously capture the images in response to detecting an audible command.

12. The media of claim 10, wherein the software is further operable when executed to:
determine that one or more of the images comprises an object;
generate an object image by cropping a region of the image comprising the object;
send instructions to perform object recognition on the object image;
receive a description associated with the object; and
provide an audible indication of the description associated with the object.

13. The media of claim 10, wherein the computing the path comprises identifying one or more obstacles between the starting point and the end point, and wherein the navigation information comprises instructions to direct the first user to the end point while avoiding the obstacles.

14. The media of claim 10, wherein the software is further operable when executed to:
identify one or more enhancements that may be applied to one or more of the images;
provide information regarding the one or more enhancements; and
receive user input in response to the provided information.

15. A system comprising: one or more processors; and a memory coupled to the processors comprising instructions executable by the processors, the processors being operable when executing the instructions to:
capture one or more images of a physical environment surrounding a first user of an online social network hosted by a social-networking system;
determine that one or more of the images comprises a face;
generate a facial image by cropping a region of the image comprising the face;
send instructions to perform facial recognition on the facial image;
receive a name associated with a second user of the online social network, wherein the face is associated with the second user, wherein the first user is represented by a first node on a social graph maintained by the social-networking system and the second user is represented by a second node on the social graph, and the first node and the second node are connected by at least one edge;
provide an audible indication of the name associated with the second user;
compute a path comprising an end point associated with a person corresponding to the face in the one or more images, wherein a starting point for the path is determined with respect to the computing device; and provide navigation information to the first user in relation to the path.

16. The system of claim 15, wherein the computing the path comprises identifying one or more obstacles between the starting point and the end point, and wherein the navigation information comprises instructions to direct the first user to the end point while avoiding the obstacles.

17. The system of claim 15, wherein the processors are further operable when executing the instructions to:
   identify one or more enhancements that may be applied to one or more of the images;
   provide information regarding the one or more enhancements; and
   receive user input in response to the provided information.

* * * * *